United States Patent [19]

Lindemann et al.

[11] 4,257,042

[45] Mar. 17, 1981

[54] ELECTRONIC PATTERN GENERATOR

[75] Inventors: Eckhard Lindemann, Raisdorf; Jörg Bröning, Heikendorf; Dietrich Asbach, Klausdorf, all of Fed. Rep. of Germany

[73] Assignee: Firma Dr.-Ing. Rudolf Hell GmbH, Kiel, Fed. Rep. of Germany

[21] Appl. No.: 912,398

[22] Filed: Jun. 5, 1978

[30] Foreign Application Priority Data

Sep. 30, 1977 [SU] U.S.S.R. .............................. 2527002

[51] Int. Cl.[2] .............................................. G06K 15/20

[52] U.S. Cl. ...................................... 340/716; 178/15; 340/727; 340/736; 340/798; 354/6

[58] Field of Search ............... 340/736, 724, 727, 797, 340/716; 178/15; 354/6

[56] References Cited

U.S. PATENT DOCUMENTS

| | | | |
|---|---|---|---|
| 2,624,798 | 1/1953 | Dinga | 178/15 X |
| 3,568,178 | 3/1971 | Day | 340/724 |
| 3,711,849 | 1/1973 | Hasenbalg | 340/736 |
| 3,725,900 | 4/1973 | Ohmann et al. | 340/716 X |
| 3,781,816 | 12/1973 | Coleman et al. | 340/797 X |
| 3,946,407 | 3/1976 | Ishii et al. | 340/724 X |
| 3,950,763 | 4/1976 | Parks et al. | 354/6 X |
| 4,121,228 | 10/1978 | Cowe et al. | 340/724 X |

*Primary Examiner*—David L. Trafton
*Attorney, Agent, or Firm*—Ernest F. Marmorek

[57] ABSTRACT

In an electronic pattern generator characters to be recorded are displayed on the screen of a cathode ray tube and then exposed on a recording medium mounted on a carrier, which is displacable in a plane parallel to the plane of the screen.

The characters are displayed from video-data recallable from a store. The recalled video-data are transformed into a first video signal for the brightness control of the electron beam of the cathode ray tube into first deflection signals for the beam and into displacement signals for the carrier.

For controlling the make-up and composing process the characters are displayed identically on a further screen of a soft copy terminal independently of the display on the screen of the cathode ray tube.

By identical display it is understood, that the various type fonts and sizes of characters are not displayed in an unitary fashion, but in the original font of writing, as they will appear later in the typographical composition on the recording medium.

By identical display it is further understood, that also the appropriate displacement motions of the carrier are taken into account when displaying the soft copy for control purpose.

The identical display is achieved by storing the first video signal and transforming it into a second video signal for the soft copy terminal with the help of different read-in and read-out signals for the storage means and different second deflection signals for the screen of the soft copy terminal.

17 Claims, 6 Drawing Figures

ELECTRONIC PATTERN GENERATOR

BACKGROUND OF THE INVENTION

The present invention relates to an electronic pattern generator for line-by-line recording of characters from stored video-data. The characters to be recorded are displayed on the screen of a cathode ray tube and then exposed on a recording medium mounted on a carrier, which is displacable in a plane parallel to the plane of the screen. The pattern generator includes a control circuit which may be controlled by commands for transforming the video data into a first video signal, for generating deflection signals required for the display of characters on the screen of the cathode ray tube and for obtaining displacement signals for the carrier.

Such characters include writing, special signs, symbols, rastered half-tone images, and graphic displays such as signatures, diagrams or line drawings. The characters required for a pattern are stored in the form of video data for the cathode ray tube in a digital memory.

The text to be set is first transformed by a composition calculator into recordable data, which constitute the commands for the pattern which is to appear on the pattern generator.

During operation the recording data recall the video data to be recorded from the digital memory sequentially, for generating the required characters. Each character called for is recorded by an appropriate brightness control of the electron beam on the screen of the cathode ray tube, the characters being arranged to yield line-by-line words, sentences, or other representations.

The image on the screen is exposed by means of appropriate optics on a film or on photo-sensitive paper. The developed film then represents already the master for offset printing. The pattern developed on the previously exposed photo-sensitive paper is denoted as the galley proof. Prior to the final generation of the printing master the text must be examined for correct layout, and if necessary, corrected and appropriately edited.

Video data terminals (VDT) may be used for correcting the texts, by means of which, in cooperation with a composition calculator, it is possible to process the recorded data. Data and complete data blocks are recalled from the composition calculator, displayed on an editing screen, corrected by means of a terminal, and again written into the composition calculator.

Although it is possible to correct the text by means of the video data terminal, it is not possible to judge the composition and make-up with respect to the type fonts, type sizes or arrangement of columns of text, heading and/or images, as the text is only displayed line-by-line or block-by-block on the screen of the video data terminal in a font of unitary fashion. In order to control the lay-out and page make-up of the composition it is therefore necessary to obtain a galley proof. This galley proof is read by the correction editor, and is again returned to the pattern generator with new correcting orders, so that the data can be appropriately corrected by means of the video data terminal.

This method is time-consuming and uneconomical. As a relatively expensive material is used for the galley proof, additional costs are generated. Development of the galley proof also requires a pre-determined time, until it is developed and ready for editing purpose. Additional time is lost by transporting the galley proof from the printing room to the editing room and back.

Recently there have become known so-called soft copy terminals, which make possible the processing of typographically difficult composing operations, such as, for example tables, advertisements, full page make-up and the like.

This soft copy terminals includes a separate character generator controlled by the pattern generator, which generates on the screen also only an unitary font. By this means normal type-faces and italics, or various other styles, such as "Antigua" or "Tempora", are reduced to an uniform matrix or style in the known soft copy terminals.

Such a standardization of fonts is a critical disadvantage, since the effect of a layout or make-up from an editing point of view can only be judged with a sufficient degree of certainty from an original character.

The resulting matrix font may contain within a predetermined region different typesizes but this region does not include by any means all typesizes occurring in practice, so that these must be equalized to a realizable size or scale.

As a result of this equalization, a distorted character occurs, and the composition is shown on the screen only in an approximate manner, compared to the galley proof, or to the final product.

The display on the screen of a known soft copy terminal does not convey, however, a true total impression required for print-setting purposes, which is considered a further disadvantage.

Video data terminals of the prior art used for correcting a text are described, for example, in "The Seybold Report", Vol. 6. No. 4, p. 4–16, No. 10, p. 10–7, No. 9, p. 9–8, and No. 10, pp. 10–4 through 10–6. A combination of a video data terminal and a known soft copy terminal is described, for example, in "The Seybold Report", Vol. 6, No. 4, p. 4–15.

SUMMARY OF THE INVENTION

In an electronic pattern generator for line-by-line recording of characters from video data recallable from memory by command, it is therefore one of the principal objects of the invention to provide control-circuit means controllable by command for transforming the video data recalled from memory into a first video signal. The first video signal preferably includes a plurality of lines, and first display means include a first screen, an electronic beam impinging on the screen and first deflection circuitry to deflect the beam on the screen are provided to receive the first video signal, and to display the characters on said first screen. The control circuit means generates first deflection signals for feeding the first deflection circuitry. A recording medium mounted on a carrier is additionally provided, and so are means for transferring at least a portion of the display on said first screen onto the recording medium. The carrier may be displaced by a first set of displacement signals with respect to the first screen in first and second directions in a plane substantially parallel to the plane of the first screen. Storage means connected to the control circuit means are provided for storing, and for transforming the first video signal into a second video signal; second display means, including a second screen, an electron beam impinging on said second screen, and a second deflection circuitry to deflect said beam on said second screen, operable to receive said second video signal and for displaying characters being identical to the characters displayed on said first screen. Write generator means are connected to said storage means generating write signals for storing said first video signal in said storage means; the write signals may be generated by coupling the first deflection signals and said set of displacement signals. Read generator means are connected to the storage means for obtaining read signals for transforming said first video signal into said second video signal and for read out said second video signal from said storage means, and for obtaining second deflection signals for feeding said second deflection circuitry in said second display means, whereby the display on said second screen may be processed independently of the display on said first screen.

It is preferable if the storage means include a storage tube; alternately the storage means may include a digital memory.

The write generator preferably includes mixing means for adding the displacement signals and the first deflection signals to the write signals, and amplifying means for varying the scale of the characters displayed on the second screen.

The first and second direction of the motion of the carrier are preferable substantially at right angles to one another, and the displacement signals are preferably obtained from first and second pulse timing signals; each pulse corresponds to a step of said recording carrier: the write generator further may include register means for adding the pulses of said timing signals, and digital-to-analog converter means postcoupled to the register means for transforming the register-processed signals into the displacement signals.

The write generator means advantageously includes a switch which has first and second positions for respectively coupling and decoupling the first deflection signals to, and from the displacement signals.

The control means advantageously includes first transforming means for rotating the first deflection signals so as to result in a transformed display mode on the first screen rotated by a pre-arranged angle from the predetermined display mode; the read generator means advantageously includes second transforming means for processing the rotated first deflection signals, so as to yield a display mode on the second screen similar to the predetermined display mode. The predetermined angle is preferably ninety degrees.

The signals received by said storage means advantageously include the first video signal, and there are advantageously provided inhibiting means for inhibiting the display of selected lines of the first video signal on the second screen.

In a preferred version, the electronic pattern generator includes a plurality of display means, and a plurality of storage means, and read generator means associated with respective of the display means.

The read generator means advantageously includes cyclical read-out means, which may be selectively coupled to the storage means for continuous read-out of a stored image.

It is advantageous if a plurality of transmission channels are postcoupled to the read generator means, and the cyclical read-out means, respectively.

The second display means may be implemented in the form of a video monitor.

In a method of generating a pattern electronically, the steps preferably include recalling video data by command line-by-line from memory, so as to form a first video signal, the first video signal including a plurality of lines, displaying the first video signal in a prearranged display mode in a predetermined plane, transferring at least a portion of the first video signal onto a recording carrier, selectively displacing the recording carrier in first and second directions at right angles to one another in a plane substantially parallel to the predetermined plane, storing the first video signal, thereafter transforming the first video signal into a second video signal, the second video signal being similar to the first video signal, and displaying the second video signal.

It is advantageous if the method further includes the steps of transforming the first deflection signals, so as to result in a display rotated by a predetermined angle from the prearranged display mode, and transforming the second deflection signals so as to substantially cancel the effect of the transformation of the first deflection signals on the second deflection signals.

In an advantageous method of the invention the method further includes the step of inhibiting the display of selected lines of the first video signal.

BRIEF DESCRIPTION OF THE DRAWINGS

For a fuller understanding of the nature and objects of the invention, reference should be had to the following detailed description, taken in connection with the accompanying drawing, in which.

DESCRIPTION OF THE PREFERRED EMBODIMENTS

Figure 1:
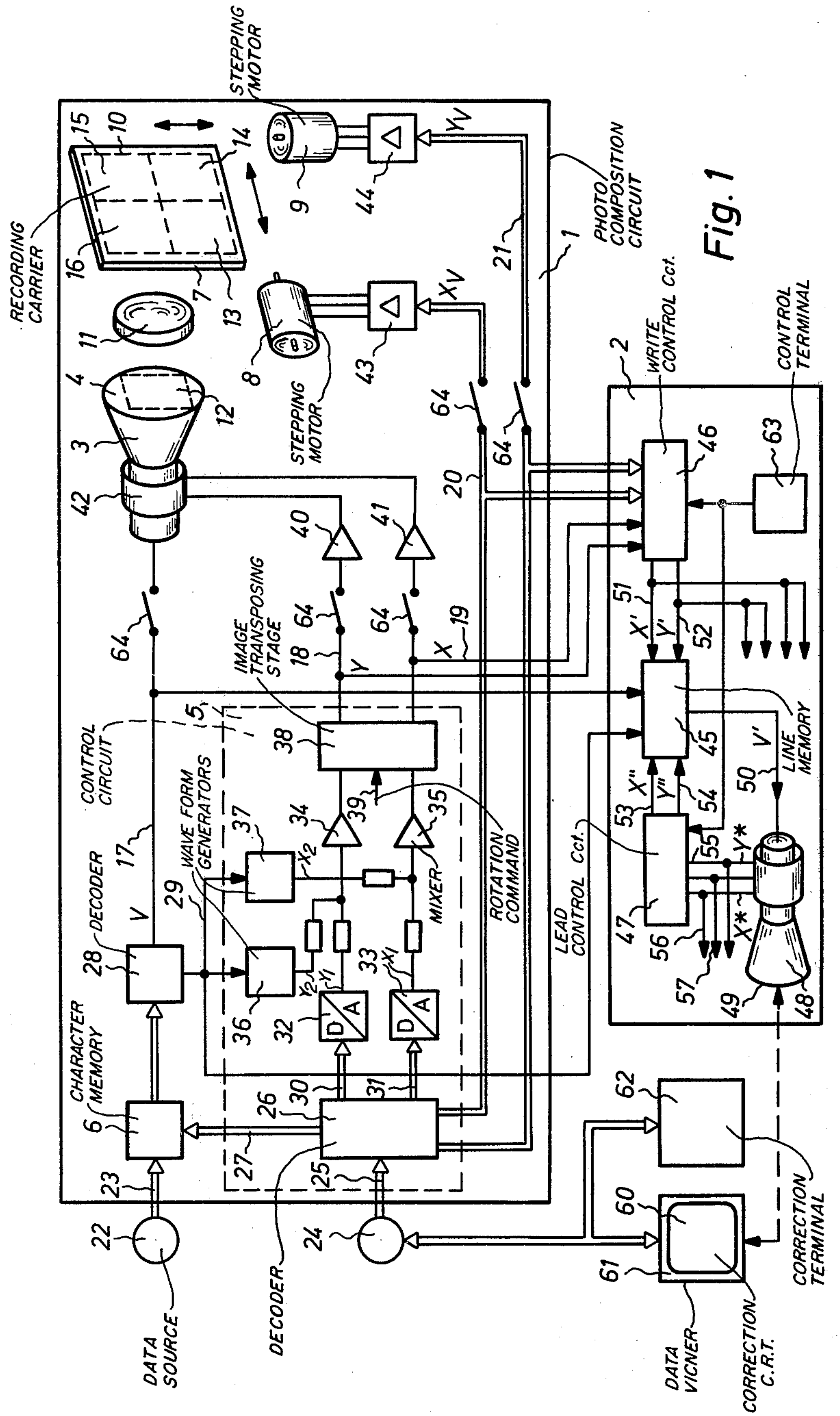
FIG. 1 is a block diagram of the pattern generator.

In carrying the invention into effect, FIG. 1 shows a block diagram of a pattern generator, and a control circuit 2 for representing the text to be set.

The pattern generator 1 includes a cathode ray tube 3 for transient display of text on a screen 4, a control circuit 5 for the cathode ray tube 3, a character storage device 6 for the video data of the characters to be generated, and a recording carrier 7. The recording carrier 7 may be displaced in a direction parallel to the surface of the screen 4 by means of the stepping motors 8 and 9.

A recording medium 10 is attached to the recording carrier 7, the information on the screen 4 of the cathode ray tube 3 being projected thereon by means of optics 11. The recording medium 10 may be a film or photosensitive paper. The exposed and developed film constitutes the master for offset printing.

Each character recalled from the character storage means 6 is recorded on the screen 4 from a plurality of vertical image lines closely disposed next to one another by means of a line raster progressing in a horizontal direction. Each image line is composed of black and white segments corresponding to the contours of the character, and the resulting brightness information carried by the electronic beam.

During recording, the individual characters are assembled to form words, sentences and other representations. At the end of each line the electronic beam recommences the next line, or the recording carrier 7 is displaced in a vertical direction by the vertical spacing between lines.

The surface which may be scanned by the electronic beam without any image distortion is the effective writing surface 12 of the screen 4.

The exposing surface 13 of the recording medium 10, which can be exposed without any displacement of the recording carrier 7, corresponds to the projection of the effective writing surface of the screen 4 onto the recording medium 10.

If it is necessary to expose a greater surface of the recording medium 10, then the recording carrier 7 is displaced in a horizontal and/or vertical direction. If exposing surface 13, corresponds, for example, to a DIN A4-page*, and if a total page having a surface of four DIN A4-pages is to be composed, then the exposing surfaces 13, 14,15 and 16 are exposed, while the recording carrier 7 is appropriately advanced.

*DIN A4 is a standard size for paper.

The aforedescribed setting is controlled by the control circuit 5, which generates from the recording data a video signal, fed to a line 17 for brightness control of the electron beam, horizontal and vertical analog deflection signals (X,Y) fed to lines 18 and 19 for positioning of the electron beam on the writing surface 12 of the screen 4, and positioning signals ($X_v$;$Y_v$) fed to lines 20 and 21 for displacement of the recording carrier 7 in X and Y directions.

The operation of the control circuit 5 will now be described in greater detail.

In an operation executed prior to the typographical composition, the characters are transformed into individual image lines, and the white and black segments of each image line are run-coded into black and white values. The black- and white-values are fed as video data into a data source 22 in the form of a perforated strip, of a magnetic tape, or a magnetic disc, the video data required for a typographical composition being transferred therefrom by a line 23 into a character memory 6 of the pattern generator 1. The recording data are also obtained prior to typographical composition from the text to be composed, which recording data contain typographical orders and commands for the pattern generator 1.

The preparation of the text is accomplished by means of a composition calculator, which is programmed on a separation of syllables and the determination of appropriate spaces.

The data prepared in the composition calculator may be fed to the memory for later use, or fed directly to the pattern generator for on-line use. In off-line operation the stored data are recalled from memory as needed. The composition calculator is denoted in the example as a data source 24, which is connected to the pattern generator 1 via a line 25.

During typographical composition the recording data recalled from the data source 24 are processed by a decoder 26, and transformed into character-, electronic beam position-, and displacement-data for intermediate storage.

The character data are made to select through a line 27 those addresses of the character memory 6, which contain the video data of the corresponding character. The video data are read out line-by-line, and are transformed in a decoder 28, post-coupled to the character memory 6, into a 2-level video signal (V) fed to the line 17, and into a start/stop signal, denoting the start and end of an image line, fed to a line 29.

The beam-position data on lines 30 and 31 are transformed in digital-to-analog converters 32 and 33, respectively, into analog signals ($X_1$; $Y_1$), and fed to mixers 34 and 35, respectively.

A sawtooth signal $Y_2$ is superimposed onto the signal $Y_1$ in a mixer 34, the sawtooth signal $Y_2$ being generated in a first generator 36.

The sawtooth voltage from $Y_2$ results in a vertical deflection of the electron beam, so as to display the image line in a line raster.

The start/stop signal on line 29, synchronizes the sawtooth generator 35, so that the sawtooth voltage $Y_2$ is started at the respective commencement of an image line, and returned to its initial position at the end of the image line.

A constant signal $X_2$ is added to the signal $X_1$ in the mixer 35 at the end of an image line, which causes a horizontal displacement of the electron beam by the spacing between lines. The constant voltage $X_2$ is generated in a second generator 37, which is also synchronized with the start/stop signal on the line 29.

The output signals $X_3$; $Y_3$ of the mixers 34 and 35 are fed to a transformation stage 38, having an amplification of unity, in which the output signals $X_3$; $Y_3$ can be inverted and/or interchanged, so as to obtain an image rotated by 90°, 180°, or 270° on the screen 4 of the cathode ray tube 3.

This process is started by a rotation command on the line 39.

The output signals of the transformation stage 38 are amplified in deflection amplifiers 40 and 41, and supplied as horizontal and vertical deflection signals X; Y to the deflection system 42 of the cathode ray tube 3 via the lines 18 and 19.

The motor stages 43 and 44 for the stepping motors 8 and 9 are fed by the displacement data $X_v$; $Y_v$. The displacement data $X_v$; $Y_v$ signalize the respective displacement position of the recording carrier 7, as the number of motor actuation or individual steps of the stepping motors.

A detailed construction of a pattern generator of this type, is shown, for example, in U.S. Pat. No. 3,305,841 of Milton Schwartz, which patent is hereby incorporated by reference.

The pattern generator 1 cooperates with the inventive control arrangement 2 for control and correction of the typographical composition.

The control circuit 2 includes an image-line memory 45, a write control circuit 46, a read control circuit 47, and a second cathode ray tube 48, for recording a display on the screen 49 identical to that on the screen 4.

The first video signal for the cathode ray tube 3 of the pattern generator 1 is written into the image-line memory 45 via line 17, and transformed therein for a display of a second stationary image into an appropriate second video signal V'. The second video signal V' is again read out from the image-line memory 45, and fed by a line 50 to the cathode ray tube 48 as pictorial information.

For control purposes the image-line memory 45 additionally receives the start/stop signal on the line 29.

The intermediate storage of the video signal in the image-line memory 45 is controlled by the write control circuit 46, and the read control circuit 47.

Deflection signals X; Y for the cathode ray tube 3 of the pattern generator 1 are fed to the write control circuits 46 via lines 18 and 19, and the displacement data $X_v$; $Y_v$ are fed thereto via the lines 20 and 21, respectively. The write control circuit 46 transforms the input signals into write signals X'; Y' on lines 51 and 52 for the image-line-memory 45.

Figure 2:
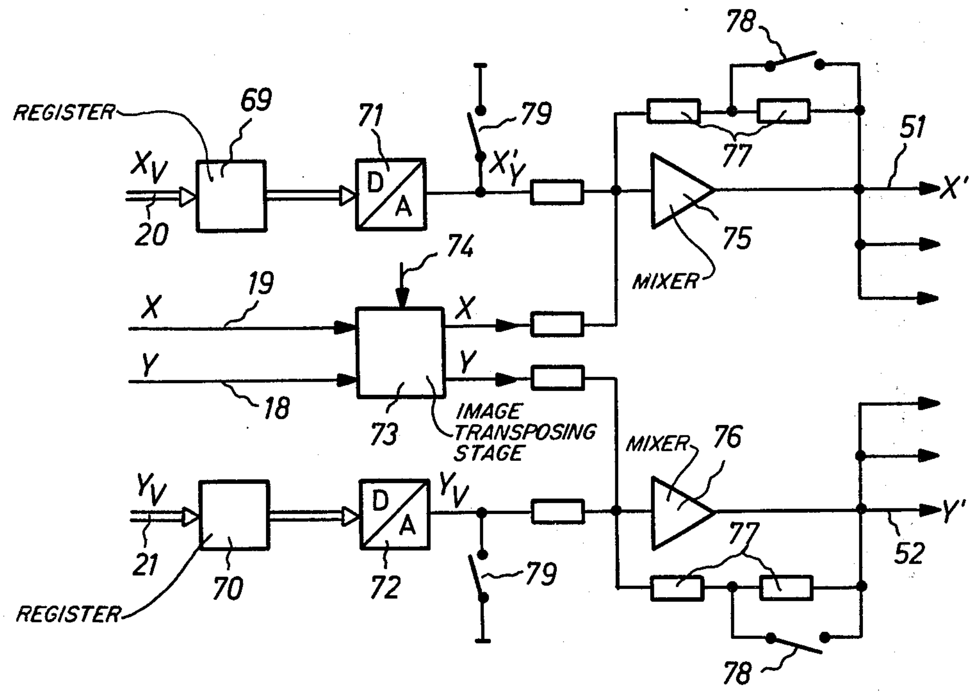
FIG. 2 is an embodiment of the write control of the circuit.

The write-control circuit 46 is shown in detail in FIG. 2.

In the read-control circuit 47 there are obtained deflection signals X"; Y", on lines 53 and 54, respectively, for the image-line memory 45, synchronized deflection signals X*; Y* on lines 55 and 56, and a synchronizing signal "Syn" on line 57 for the cathode ray tube 48 of the control circuit 2.

The video information which has been stored by way of an intermediate arrangement in the image-line memory 45 is cyclically read out 50 times per second therefrom by means of the read control circuit 47, and displayed line by line as a stationary soft copy on the soft copy screen 49 of the cathode ray tube 48, the display being completely identical with the galley proof or the typographical composition shown on the screen 4 of the cathode ray tube 3.

By identical display it is understood, that on recording, also the appropriate displacement motions of the recording carrier 7 are taken into account. In the example selected thus not only the exposing surface 13 of the recording medium 7, but the total page to be reproduced (surfaces 13,14,15 and 16) are shown in a reduced manner. Identical display also denotes that the various fonts are not displayed in a unitary fashion, but in the genuine font or type of writing, as they are to appear later in the typographical composition.

By the identical display of fonts and construction of typographically difficult make-up, such as complicated advertisements and tables having multiple columns, can be simply corrected in an improved manner, Such a correction can be accomplished, for example, by two-way correspondence between the soft copy screen 49 of the control circuit 2, and a video data screen 60 of a editing terminal (VD7) 61, which in turn cooperates with a composition calculator or programmer, and a data memory, in the example shown in FIG. 1, with data source 24.

The text to be examined is called for by the data source 24 via the control circuit 5 of the pattern generator 1, and displayed via the control circuit 2 on the soft copy screen 49. Simultaneously, the data blocks corresponding to the text recalled including text numerals, line numerals and composition commands, are displayed on the video data screen 60.

The layout on the soft copy screen 49 is evaluated by optical examination. In the event of a correction, a corresponding place or location to be corrected on the video data screen 60 is achieved, for example, by a light mark or cursor.

By means of a terminal 62, the desired change in the text, such as completion, memorization or exchange is achieved, the text is returned to the composition calculator for rearrangement of data, and the corrected text is recalled again for display.

Correction can also be made by providing addresses and lines on a correction tape. During processing by the calculator any missing codes of the first tape, which are controlled by the correction tape, are replaced, and a second tape is fabricated, for example, by appropriate tape splicing.

Various commands may be sent to the control circuit 2 during correction by an operator via a further control terminal 63.

For example, by a command "format", it can be determined whether only an exposing surface, or a whole page should be displayed on the soft copy screen 49.

The typographical composition can be either shown in reduced or enlarged scale or by segments, by means of a further command denoted "scale". By appropriate erasure commands the displays shown on the respective display screens can be erased.

Finally by means of a rotation command to the control circuit 2, any rotation of the typographical composition achieved in the transformation stage 38 of the pattern generator can be annulled, so that the typographical composition is always shown in a readable form on the soft copy screen 49.

The resolution of the soft copy screen 49 of the cathode ray tube 48 is coarser than that of the cathode ray tube 3 of the pattern generator 1. It is possible to operate, for the purpose of displaying text with a coarser resolution, than when operating with a typographical composition. Therefore, the characters on the soft copy-screen 49 are shown somewhat coarser. Such a coarse display is obtained in an advantageous manner by inhibiting certain image lines during recording of the characters of the soft copy-screen 49. For example, each fourth image line only may be shown.

The cathode ray tube 48 of the control circuit 2 may be fed by the control unit circuit 5 of the pattern generator 1, or alternatively by its own control circuit, operating in parallel with that of the pattern generator 1.

Simultaneous recording of the typographical composition on the screen 4 of the cathode ray tube 3 is not required for functioning of the control circuit 2. In the illustrative examples shown, the cathode ray tube 3 may therefore be interrogated by means of the switch 64 in a non-illuminated or dark state, and the readout of the composition may be interrupted.

For a simultaneous representation of several typographical compositions which are alike or differ, it is possible to use a plurality of cathode ray tubes 48.

In such a case, one of the soft copy screens can be selected for displaying a predetermined layout.

It is finally also possible to transfer typographical compositions to cathode ray tubes 48, which are disposed remotely from the pattern generator.

In the case of a pattern generator which is controlled by an external non-integrated composition calculator, the programmer can be connected in on-line operation to an appropriate interface of the pattern generator 1, or it may operate as a self-contained peripheral device.

Circuit 2 shows an implementation example for the write-control circuit 46.

The displacement data ($X_v$; $Y_v$) on lines 20 and 21 are pulse timing signals, each pulse corresponds to a step of the recording carrier 7. The advance of the recording carrier 7 relative to the screen 4 of the cathode ray tube 3, which takes place during operation of the character generator 1, is determined by adding the pulses of the timing signals with the help of the registers 69 and 70. The amounts are transformed into additional analog deflection signals ($X'_v$; $Y_v$) in postcoupled digital-to-analog converters 71 and 72, respectively, for an additional deflection of the electron beam of the cathode ray tube 48 of the control circuit 2. The additional deflection signals ($X'_v$; $Y'_v$) being proportional to the displacement motions of the recording carrier 7.

The horizontal deflection signal X on the line 19 and the vertical deflection signal Y on the line 18, are fed to a further transformation stage 73, in which the rotation of the display on the image screen 4, obtained with the aid of the transformation stage 38 of the pattern generator 1, is annulled, so as to obtain a readable display on the soft copy screen 49 of the control circuit 2.

This annulment of a rotation of the image in the transformation stage 73, which has a gain of unity, is obtained by inverting and interchanging of the input signals. The transformation stage 73 is activated by a rotation cancellation command 74, which is triggered by a corresponding rotation command on the line 39 for the transformation stage 38 of the pattern generator 1.

The horizontal deflection signals X and $Y'_v$ are added in a mixer 75, so as to obtain a write signal X'.

Similarly, the vertical deflection signals Y and $Y'_v$ are combined in an additional mixer 76 to a write signal Y'.

The addition of the deflection signals in turn causes a displacement of the typographical composition on the soft copy screen 49 by an amount identical to that obtained by the displacement motion on the recorder carrier 7.

The amplification of the mixers 75 and 76 can be halved by a command "format", so that in case of a re-formation of the whole page, all exposing surface 13, 14, 15, and 16 of the composition are simultaneously reduced by a factor of 2 on the soft copy screen 49.

Halving of the amplification factor of a mixer is obtained by bridging of one of the feedback resistors 77 by means of a switch 78, all resistors 78 having the same value. The switch 78 is controlled by the "format" command.

The scale may, of course, be changed by an appropriate adjustment of the amplification.

In case an enlarged display of one of the exposing surfaces 13, 14, 15, or 16 is desired, the deflection signals $X'_v$ and $Y'_v$ are disconnected by the switches 79, so that the addition of the deflection signals does not take place, and the halving of the amplification factor is cancelled.

Several image line memories 45 and, consequently, several cathode ray tubes 48, can be controlled by means of the write signals X' and Y' on the lines 51 and 52.

Figure 3:
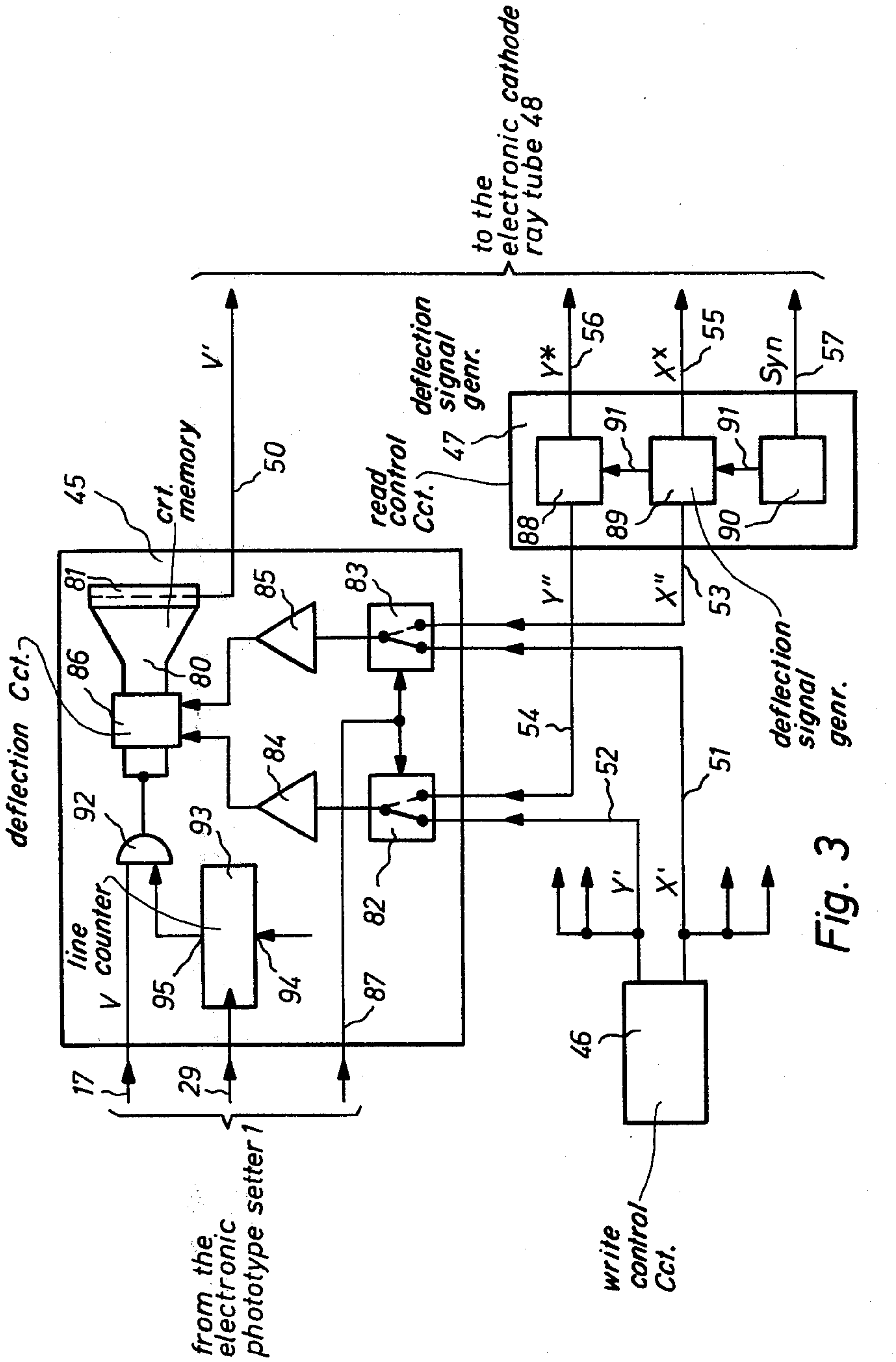
FIG. 3 is an embodiment of a memory for storing image lines, and for a read-control circuit.

FIG. 3 shows an implementation example for an image line memory 45, and for the read-control circuit 47.

The image line memory 45 includes a memory tube 80 (silicon-target memory tube), for example, of the type 639S of the Hughes Company. Such a memory tube is described in detail in the "customer service application notes", 91-11-009, of Apr. 19, 1973 of the Hughes Company.

In a memory tube of this type the arriving video signal is stored on the memory layer or target 81 of the memory tube 80 in the form of an electrostatic charged image by means of the electron beam controlled by write signals during the writing phase. During the reading phase, the charged image is again scanned by the electron beam now controlled by write signals, and the charges are transformed into a modified video signal and read-out.

In liew of the memory tube 80 having a single beam, it is also possible to use a memory tube having separate beams for the write and read processes, respectively. In the writing phase, the write signals X' and Y', which are generated in the write-control circuit 46, are passed to the deflection system 86 of the memory tube 80, via lines 51 and 52, and electronic switches 82 and 83, and via deflection amplifiers 84 and 85, respectively.

The electronic switches 82 and 83 are shown in FIG. 3 as contact switches, which are controlled by corresponding write and read commands of the second generator 1 through a line 87.

The video signal (V) 17, which arrives from the pattern generator 1, controls the brightness scanning of the electron beam, so that on the target layer 81 of the memory tube 80, a virtual image of the photo-composition results.

The read signals X'' and Y'' are obtained in the deflection generators 88 and 89 of the read-control circuit 48, and fed during the reading phase via lines 53 and 54, and via the electronic switches 82 and 83, respectively, to the deflection system 86 of the memory tube 80. During the read-phase, the contacts are in the positions shown dotted.

Deflection generators 88 and 89 are synchronized via line 91 through a control stage 90.

The deflection generators 88 and 89 simultaneously generate the deflection signals X* and Y* on the lines 55 and 56, respectively, for the cathode ray tube 48 of the control circuit 2. The read-signals (X''; Y''), and the deflection signals (X*; Y*) are such that a line-by-line recording on the soft copy screen 49 is generated, so that the image can also be displayed by a conventionally available video monitor, for example, of the type DCM 44 of the AEG Telefunken company. As a video monitor has internal deflection circuits, it is sufficient to feed only the synchronization signal generated in the control stage 90 to the video monitor via the line 57, instead of the deflection signals X* and Y*.

The read control-circuit 47 contains a further non-illustrated control stage, which controls the mode of operation (read-, write-, erase-mode, and the like) of the image memory. Additional control signals result in partial erasure of the image, and/or any changes thereof, as well as in any completion or supplements to the typographical composition being shown. The read-control circuit 47 may additionally influence the display scale.

The read-control circuit 47 is also described in detail in the referenced U.S. Pat. No. 3,305,841. If a plurality of cathode ray tubes 48 are used for simultaneous display of the layouts, then an image-like memory 45, and a read-control circuit 47 each is associated with a cathode ray tube 48. The write-control circuit 46 is, however, provided as a single unit.

As has already been mentioned, only each $n^{th}$ line is recorded on the soft copy screen 49 of the cathode ray tube 48 from the image lines recalled from the character memory 28 of the pattern generator 1. For this purpose there is disposed within the image line memory 45 in the signal path of the video signal an AND-gate 92, which is controlled by an image-line counter 93. The start/-stop signal supplied from the pattern generator 1, on line 29, which always signals the end of an image line, is counted by the image-line counter 93. The image line counter 93 may be pre-set to the number of the image lines to be inhibited through the program input 94. If the count corresponds to the pre-set value, the output 95 of the image-line counter 93 falls into the "H", or high output region. The AND-gate 92 is therefore prepared, and the video signal of the image line which follows passes for further processing into the memory tube 80. Advantageously, the inhibition of the image lines may already be accomplished during reading out of the video data line-by-line from the character memory 28 of the pattern generator 1, which saves writing time.

Figure 4:
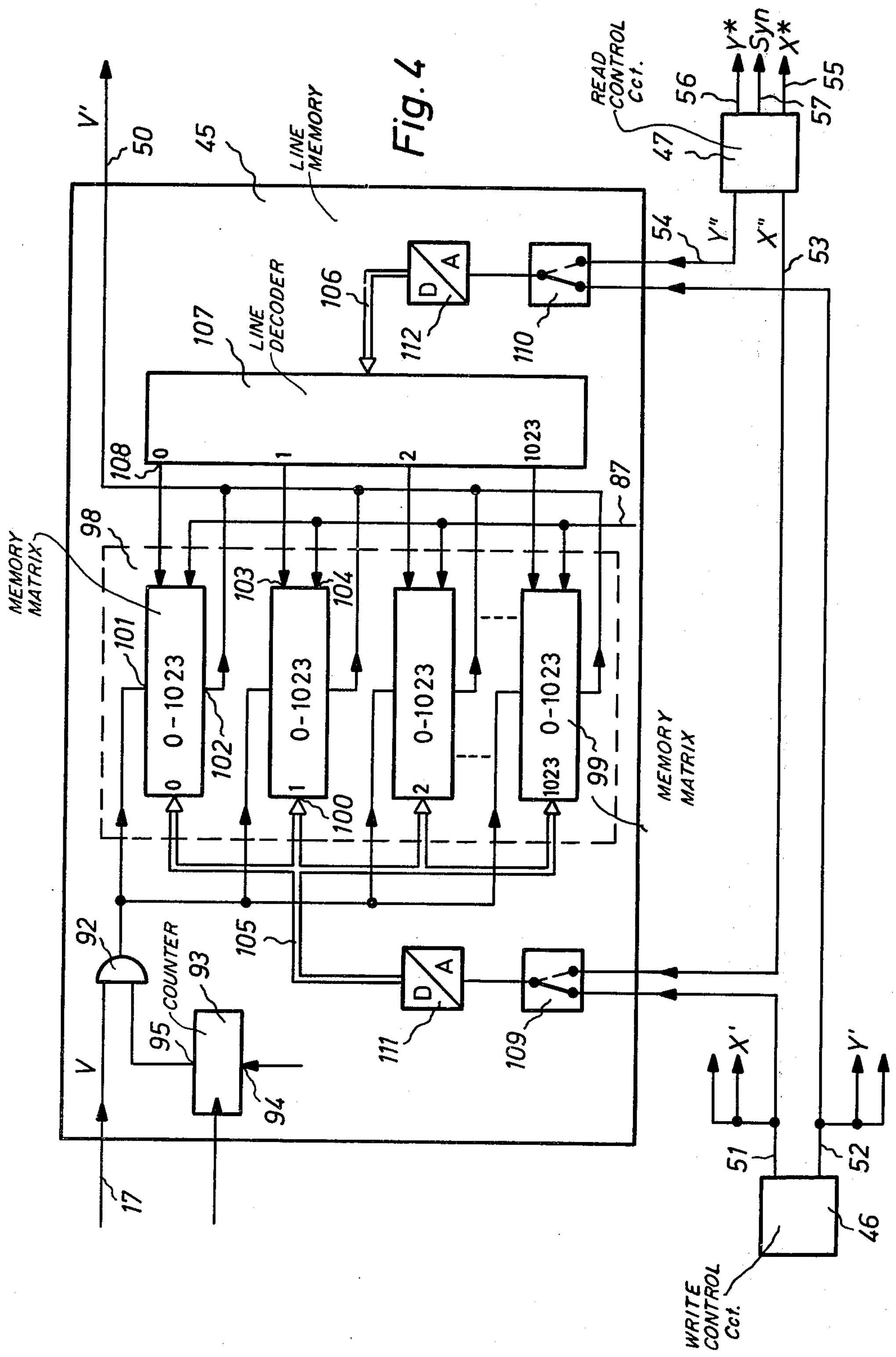
FIG. 4 is a further embodiment of a memory for storing lines.

FIG. 4 shows a further implementation example for the image line-memory 45.

The image-line memory 45 consists essentially of a bit-organized, two dimensional memory matrix 98 having, for example, a capacity of 1,024 times 1,024 bits for receiving of the video information of the photographical composition to be displayed. Each memory cell of the memory matrix 98 may be addressed in correspondence with the position data for the electronic beam of the cathode ray tube 3, by an X address and by a Y address, of each of ten bits.

The memory matrix 98 consists, for example, of 1,024 signal write/read memories 99 (RAM) of type TMS 4,033 of Texas Instruments, having a memory organization of 1,024 times 1 bit, each write/read memory 99 receiving video data of a single line.

The integrated modules are commercially available and known in the trade, so that a detailed description of their construction and operation is not required. It will be understood that any other memory organization or memory construction may also be used.

Each write/read memory 99 has address inputs 100, a data input 101, a triple state data output 102, a selection input 103, and a write/read input 104.

Lines 105 which carry the X-addresses, are in communication with the address inputs 100 of each write/-read memory 99.

The lines 106, which carry the Y-addresses in BCD code, feed a line decoder 107 (for example a BCD decimal decoder type SN2447). The outputs 108 of the line decoder 107 and the write/read memories 99 connected appropriately via the selection inputs 103 carry the numerals 0 to 1,023, so that the particular write/read memory 99 may be selected and activated, which corresponds to an appropriate line number or Y-address.

While the Y-address selects the associated write/read memory 99 corresponding to a line, the X-address addresses one of the memory cells within the selected write/read memory 99, so that an X—Y address combination addresses an appropriate memory cell of the memory matrix 98.

In the write phase the analog write signals X' and Y' of the write-control circuit 46 are transformed in the 10 bit analog-to-digital converters 111 and 112 into the X and Y addresses carried by the lines 105 and 106, respectively, being carried thereto by the lines 51 and 52, and electronic switches 109 and 110, respectively, the switches 109 and 110 being shown in FIG. 4 as mechanical switches.

The associated video information, which is supplied via the line 17 from the pattern generator 1, is fed by the X-Y-addresses to the appropriate memory cells, the logical "H" corresponding for example, to the video information "black", and the logical "L" corresponding to the video information "white".

As the addresses correspond position-wise to the individual beam positions on the screen 4 of the cathode ray tube 3, there is built up in the memory matrix 98 a virtual image of the photo-composition.

Following storage in the memory matrix 98 the photo-composition image may frequently be changed by writing thereover of characters. If, in such a case, a memory cell is newly addressed, which has already stored the information "H", this information remains stored.

During the read-out phase, the electronic switches 109 and 110 are shown in the dotted position, and the analog-to-digital converters 111 and 112 then receive the read signals X'' and Y'' generated in the read-control circuit 47. The read signals X'' and Y'' are patterned, so that the read-out of the video information from the memory matrix 98 is accomplished synchronously with the line-by-line recording on the soft copy screen 49, and is also performed line-by-line.

Initially, all X-addresses of the first write/read memory 99 are continuously recalled, and the video data of the first line are read out serially via the line 50 and recorded. At the end of the line, by an appropriate Y-address, the second write/read memory 99 is addressed, and the video information of the following line is read out.

By repeated cyclic read out of the whole memory information, there is formed on the soft copy screen 49 the desired stationary typographical composition of an unlimited duration. Recording can be made also by interleaved scanning, namely, if in a first scanning period the uneven lines, and in a second scanning period, even lines are read out from the memory matrix 98.

If the cathode ray tube 48 has its own deflection generators, it is sufficient to transmit only the synchronizing signal "SYN" from the read-control circuit 47 to the cathode ray tube 48. In this case the X and Y addresses for the reading process can also be generated by the counter in the read-control circuit 47, so that an analog-to-digital conversion of the analog read signals X''; Y'' into the addresses need not be undertaken.

The contents of the memory matrix 98 may be erased by reading in the information "L" into each memory cell, which also erases the photo-composition displayed on the soft copy-screen 49.

The scale of the display on the soft copy screen 49 may be changed via the write signals (X'; Y'), by the read signals (X''; Y''), or by the deflection signals (X*;Y*) for the cathode ray tube 48.

If several cathode ray tubes 48 are provided for a simultaneous display of layouts, then a memory matrix 98 and a read control circuit 46 are associated with each cathode ray tube 48, while the write-control circuit 46 is implemented only once. In a preferred implementation image-replay or line-memories are associated with each cathode ray tube 48. The relatively costly and bit-organized memory matrix 98 is common, however, to all cathode ray tubes 48. The system may be operated, for example, by a first photo-composition being initially written into the memory matrix 98, and then being transferred into a first image replay or line-memory.

While the first image replay or line-memory is cyclically read out for display of the first stationary photo-composition, the memory matrix 98 may already be filled with the second photo-composition, which is then transferred to a second image-replay or line-memory.

It may be advisable, in the case of an image replay or line-memory, to read out the video data of a partial line in parallel, and transfer it to a shift register, which is then sequentially read out at the line frequency of the cathode ray tube 48.

While the information is read out from the shift register, the new memory cells may already be addressed, so that the access time is reduced.

A particular advantage of the digital intermediate storage of the video signal is the fact that the cathode ray tube 48, or the video monitors may be installed in a location remote from the pattern generator 1, and the video data may be transferred from the memory matrix to a corresponding image replay or line-memory at the receiving location by transmission channels. The video data may be read out from the memory matrix 98 in any arbitrary fashion and at any desired data rate.

Figure 5:
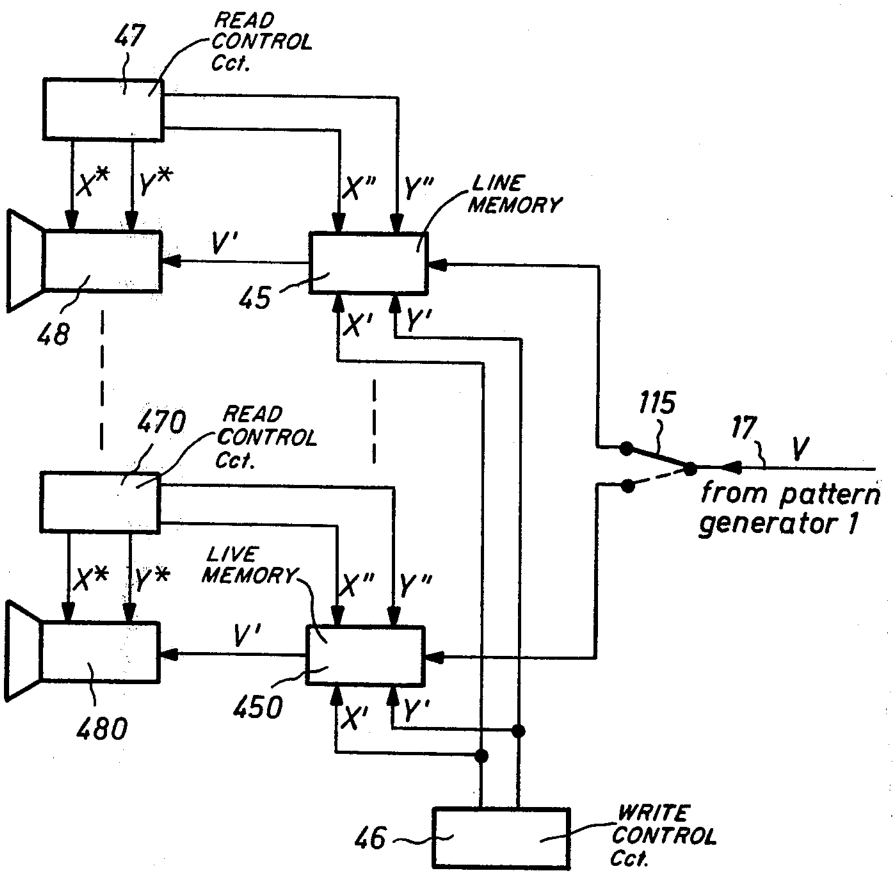
FIG. 5 shows a block circuit diagram when a plurality of display means are used.

Referring now to FIG. 5, which shows an arrangement using a plurality of cathode ray tubes, such as a cathode ray tube 48, and a cathode ray tube 480, it will be seen that an image line storage means, such as a line memory, is associated with each cathode ray tube; in FIG. 5, a line memory 45 is associated with a cathode ray tube 48, and a line memory 450 is associated with a cathode ray tube 480, so that several photocompositions of equal or different contents, can be displayed simultaneously.

It will be understood that the number of displays can be extended as desired.

The video signal V appearing on the line 17, can be written into either the line memory 45, or the line memory 450, and displayed on the associated cathode ray tube, that is on either cathode ray tube 48, or cathode ray tube 480.

The write-in process is controlled by the common write control 46.

Figure 6:
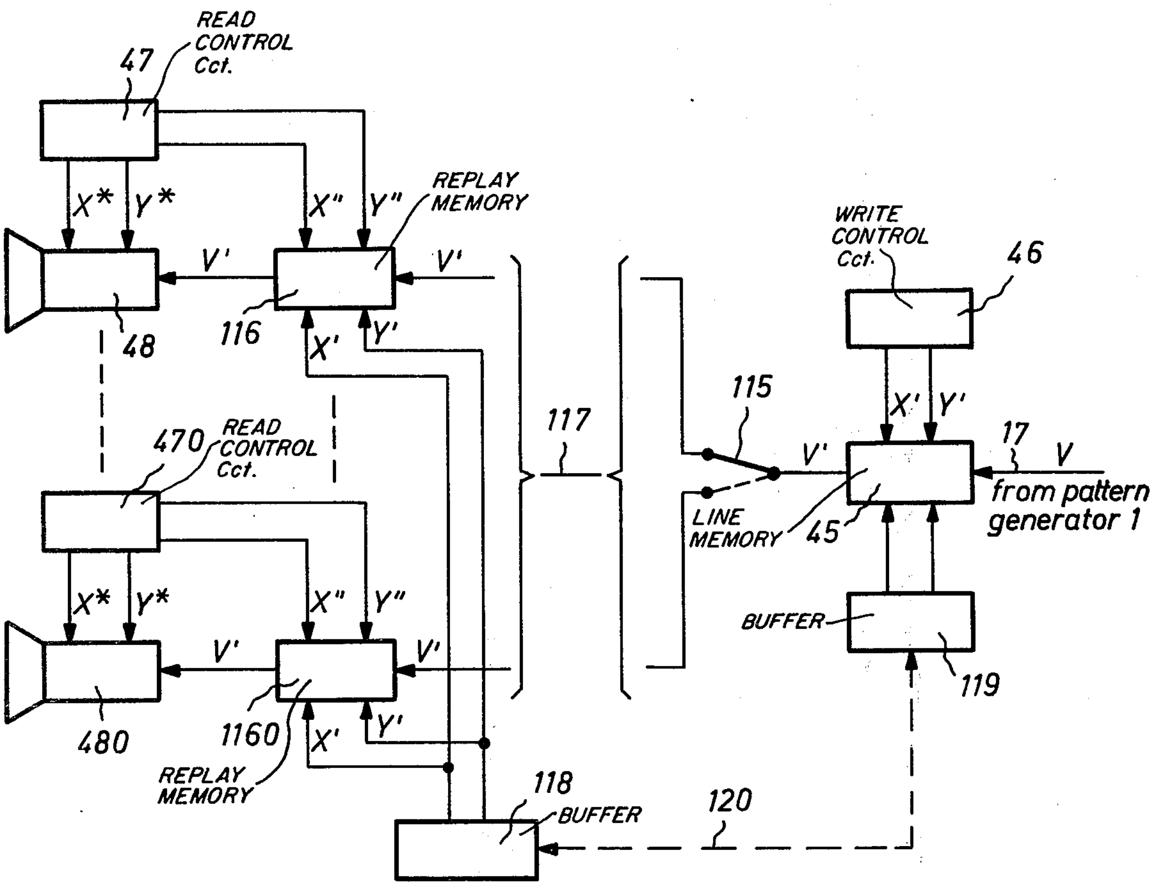
FIG. 6 is an alternate version of FIG. 5.

FIG. 6 shows a variant of the circuit of FIG. 5. An image, or replay memory is associated with each cathode ray tube; in the example shown, an image memory 116 is associated with the cathode ray tube 48, and an image memory 1,160 is associated with the cathode ray tube 480. The corresponding read control circuits associated with the respective cathode ray tubes are read control circuit 47, associated with the cathode ray tube 48, and read control circuit 470, associated with the cathode ray tube 480.

As in the arrangement of FIG. 5, the circuit in FIG. 6 can also be extended so that a plurality of displays can be shown.

The first video signal V, obtained from the pattern generator 1, and appearing on the line 17, is transformed in the line memory 45, into a second video signal V'. The write-in process is controlled by the write control circuit 46. An image or image replay memory, such as image memories 116, and 1,160, can again be selected to receive the appropriate video information.

The second video signal V' is transmitted via transmission means 117, from the line memory 45, into the selected image reply memory 116, or 1,160. The transmission means 117 may be a conventional cable, for internal transmission. For remote transmission, the transmission means 117 may be any suitable transmission channel, which terminates at the transmit- and receive-sides in appropriate modems. Such modems are commercially known, and are supplied, for example, by the Codex Company, under the tradename "Codex 4,800".

The transfer from the image line memory 45 to the image replay memories 116, or 1,160, is controlled by stages 118, and 119, which are synchronized by means of a line 120.

We wish it to be understood that we do not desire to be limited to the exact details of construction shown and described, for obvious modifications will occur to a person skilled in the art.

Having thus described the invention, what we claim as new and desire to be secured by Letters Patents, is as follows:

1. In an electronic pattern generator for line-by-line recording of characters from video-data recallable from memory by a command, in combination, control-circuit means controllable by said command for transforming the video-data recalled from memory into a first video signal, first display means, including a first screen, an electron beam impinging on said first screen, and a first deflection circuitry to deflect said beam on said first screen, operable to receive said first video signal and for displaying said characters on said first screen, said control-circuit means generating first deflection signals for feeding said first deflection circuitry, a recording medium mounted on a recording carrier, means for transferring at least a portion of the display on said screen on said recording medium, said recording carrier being displaceable by a set of displacement signals with respect to said screen in first and second directions in a plane substantially parallel to the plane of said screen, storage means connected to said control-circuit means for storing said first video signal and for transforming said first video signal into a second video signal;

second display means, including a second screen, an electron beam impinging on said second screen, and a second deflection circuitry to deflect said beam on said second screen, operable to receive said second video signal and for displaying characters being identical to the characters displayed on said first screen, write generator means connected to said storage means generating write signals for storing said first video signal in said storage means, said write signals being produced by coupling the first deflection signals and said set of displacement signals, and read generator means connected to said storage means generating read signals for transforming said first video signal into said second signal and for read out of said second video signal from said storage means, and for obtaining second deflection signals for feeding said second deflection circuitry in said second display means, whereby the display on said second screen may be processed independently of the display on said first screen.

2. An electronic pattern generator according to claim 1, wherein said storage means includes a storage tube.

3. An electronic pattern generator according to claim 1, wherein said storage means includes a digital memory.

4. An electronic pattern generator according to claim 1, wherein said write generator means includes mixing means for adding the displacement signals and said first deflection signals to said write signals.

5. An electronic pattern generator according to claim 4, wherein said mixing means includes amplifying means for varying the scale of the characters displayed by said display means.

6. An electronic pattern generator according to claim 1, wherein said first and second directions are substantially at right angles to one another, wherein said displacement signals are obtained from first and second pulse timing signals, each pulse corresponds to a step of said recording carrier, and wherein said write generator means further includes register means for adding said pulses of the timing signals, and further comprising digital-to-analog converter means postcoupled to said register means for transforming the register-processed signals into said displacement signals.

7. An electronic pattern generator according to claim 1, wherein said write generator means includes switch means having first and second positions for respectively coupling and decoupling said first deflection signals to, and from said displacement signals.

8. An electronic pattern generator according to claim 1, wherein said control means further includes first transforming means for rotating the first deflection signals so as to result in a transformed display mode on said first screen rotated by a prearranged angle from a predetermined display mode, and wherein said write generator means includes second transforming means for processing the rotated first deflection signals, so as to yield a display mode on said second screen similar to said predetermined display mode.

9. A pattern generator according to claim 8, wherein said predetermined angle is ninety degrees.

10. An electronic pattern generator according to claim 1, wherein the signals received by said storage means includes said first video signal, and further comprising inhibiting means for inhibiting the display of selected lines of said first video signal on said second screen.

11. An electronic pattern generator according to claim 1, further including a plurality of display means, and a plurality of storage means and read generator means associated with respective of said display means.

12. An electronic pattern generator according to claim 11, wherein said read generator means includes cyclical read-out means for continuous read-out of a stored image selectively couplable to said storage means.

13. An electronic pattern generator according to claim 12, further comprising a plurality of transmission channels postcoupled to said read generator means and said cyclical read-out means, respectively.

14. An electronic pattern generator according to claim 1, wherein said second display means includes a video monitor.

15. In a method of generating a pattern electronically, the steps comprising:

recalling video data by command line-by-line from memory so as to form a first video signal, the first video signal including a plurality of lines, displaying the first video signal in a prearranged display mode in a prearranged plane, transferring at least a portion of the first video signal onto a recording carrier, selectably displacing the recording carrier in first and second directions at right angles to one another in a plane substantially parallel to the predetermined plane, storing the first video signal, thereafter repeatedly transforming the first video signal into a second video signal, the second video signal being similar to the first video signal, and continuously displaying the second video signal.

16. In a method according to claim 15, further comprising the steps of transforming the first deflection signals so second deflection signals.

17. In a method according to claim 15, further comprising the step of inhibiting the display of selected lines of the first video signal.

* * * * *